(No Model.)
W. BARTHOLOMEW.
CARPET CLEANING MACHINE.
No. 459,540. Patented Sept. 15, 1891.
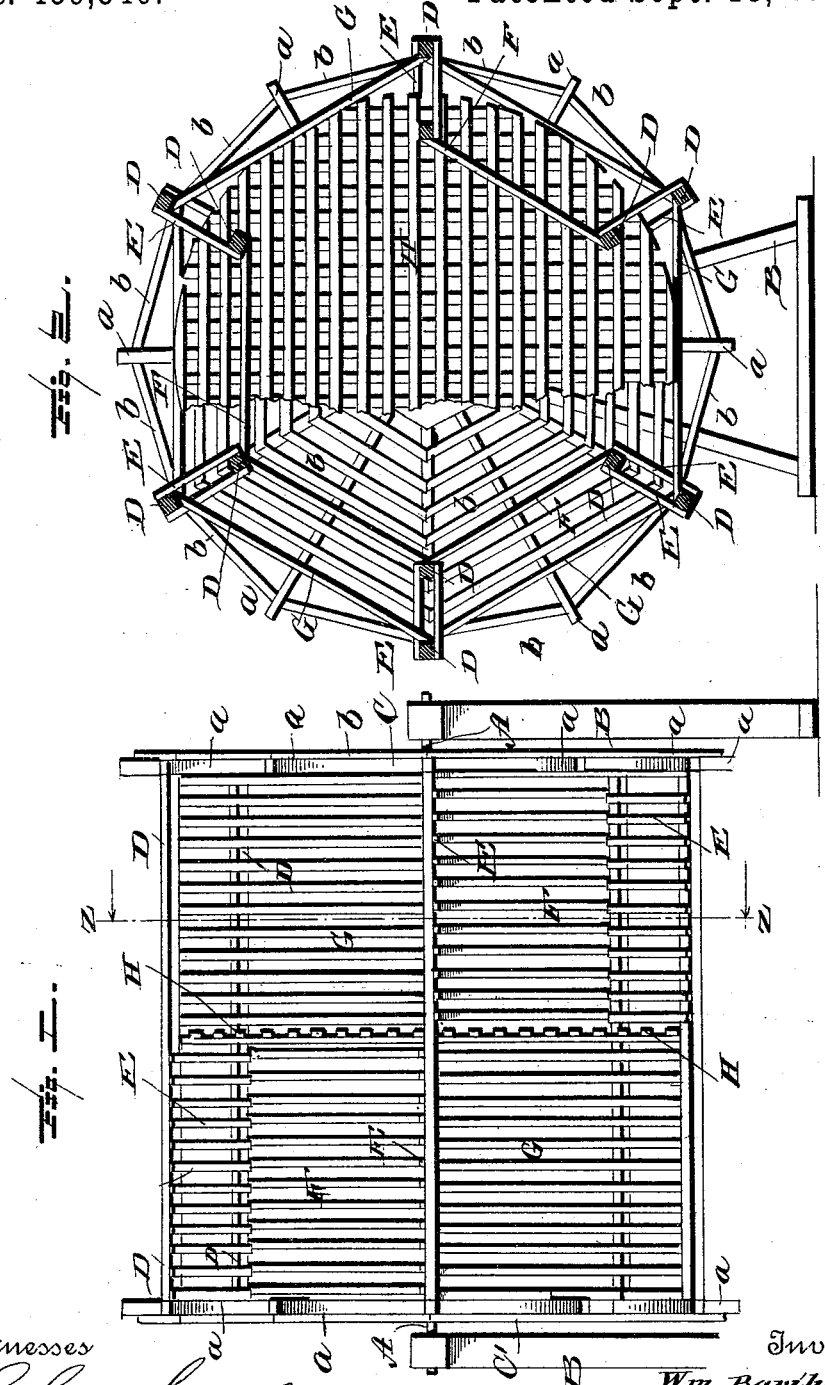
Witnesses
L. C. Hills
E. H. Bird
Inventor:
Wm. Bartholomew
E. B. Stocking
Attorney

UNITED STATES PATENT OFFICE.

WILLIAM BARTHOLOMEW, OF AMSTERDAM, NEW YORK, ASSIGNOR OF ONE-HALF TO JOHN BARTHOLOMEW, OF SAME PLACE.

CARPET-CLEANING MACHINE.

SPECIFICATION forming part of Letters Patent No. 459,540, dated September 15, 1891.

Application filed May 2, 1891. Serial No. 391,375. (No model.)

*To all whom it may concern:*

Be it known that I, WILLIAM BARTHOLOMEW, a citizen of the United States, residing at Amsterdam, in the county of Montgomery, State of New York, have invented certain new and useful Improvements in Carpet-Cleaning Machines, of which the following is a specification, reference being had therein to the accompanying drawings.

This invention relates to certain new and useful improvements in carpet-cleaning machines of that class wherein provision is made for the carrying up of the carpets and permitting them to drop from the top of the machine to a platform or analogous support, so that the dirt will be removed from the carpets.

The present invention has for its objects, among others, to provide an improved machine of this class having a double drum or cylinder with the pockets in one half arranged alternately with those of the other half, whereby the weight of the carpets is more evenly distributed throughout the machine, said distribution of weight assisting materially in equalizing the motion of the machine when in operation. The goods are dropping from either one or the other almost constantly. The drum is divided by a central partition, which greatly strengthens the machine, and by its use different grades of carpets can be treated at the same time independent of each other. The carrying-pockets of one portion of the drum are arranged opposite the platforms of the other half of the drum. The pockets are of novel shape, being a sort of dovetail shape, with the largest surface at the outside of the drum or cage, which tends to separate and spread the goods instead of bunching them.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side elevation of the drum or machine complete. Fig. 2 is a vertical cross-section of the same on the line $z\ z$ of Fig. 1, looking in the direction of the arrows in the latter, with the cross-partition broken away.

Like letters of reference indicate like parts in both of the views.

Referring now to the details of the drawings by letter, A designates the pintles or journals of the drum or cage, which may be arranged to have bearings in any suitable support, as B, and designed to be driven from any suitable source of power. The drum consists of heads C and C', which may be of any desired form of construction, preferably consisting of radial spokes or bars $a$ and slats or bars $b$, secured thereto in any suitable manner and arranged in any desired form, leaving spaces therebetween, as seen in Fig. 2. The heads are connected by the longitudinal bars D, arranged in sets of two or more, the bars of each set arranged in line radially from the center of the drum, as shown in Fig. 2. These bars are connected by the short bars E, arranged upon opposite sides of the bars D upon each half of the drum and forming one side of the wedge-shaped pockets. To the inner edges of the inner bars of each set are secured the bars F, which constitute the platforms on which the carpets fall as they are released from the pockets, which are arranged directly opposite them. Alternating with these platforms are the bars G, which are secured to the outer bars D of each set, the bars secured to the outer bars D alternating with those secured to the inner bars D, as clearly shown in Fig. 2, so that the inwardly-extending platforms of one half of the drum alternate with the outwardly-extending platforms of the other half, the drum being divided, preferably, centrally by a slatted partition H, which is secured to and supported by the bars D, as shown. The bars of the platforms and those short bars which connect the inner and outer bars D of each set constitute the pockets, which are a sort of dovetail shape, as seen in Fig. 2, with the largest surface at the outside of the drum, so as to separate and spread the carpets.

The operation will be apparent. The carpets are introduced into the drum through an opening provided therefor, which may be one of the outer or inner platforms hinged or otherwise constructed for this purpose, and as the machine is revolved the carpets will be taken up by the pockets and carried to the upper portion of the drum, where they are thrown onto the platform opposite. The pockets alternating, as they do, in the two halves of the drum, a carpet will be falling at all times from one side or the other of the machine, and the weight will thus be equalized and the motion of the machine more steady and uniform. One grade of carpet may be placed in one portion of the drum and those of another grade in the other half.

What is claimed as new is—

1. A slatted carpet-cleaning drum provided with slatted substantially V-shaped pockets with their largest surface at the outside of the drum, substantially as and for the purpose specified.

2. A slatted carpet-cleaning drum subdivided and provided with slatted alternately-arranged pockets and platforms, as set forth.

3. A slatted carpet-cleaning drum subdivided and provided with slatted alternately-arranged pockets substantially V-shaped, with their largest surface at the outside of the drum, as set forth.

4. A carpet-cleaning drum consisting of slatted heads, longitudinal connecting-bars in sets arranged in radial line, a central slatted partition secured to the longitudinal bars, and pockets at the outer surface of the drum, as shown and described.

5. A carpet-cleaning drum consisting of slatted heads, longitudinal connecting-bars arranged in sets radially, short bars connecting the bars of each set and alternately arranged, and bars connecting the longitudinal bars and alternately arranged, substantially as and for the purpose specified.

In testimony whereof I affix my signature in presence of two witnesses.

WILLIAM BARTHOLOMEW.

Witnesses:
CHARLES S. NISBET,
HARVEY BOOK.